Feb. 16, 1960   C. J. SMITH ET AL   2,925,059
METHOD AND APPARATUS FOR MAKING CAN BODIES
Filed Feb. 19, 1957   11 Sheets-Sheet 1

INVENTORS.
Clarence J. Smith
Peter Bogner
By: Olson & Trexler attys.

Feb. 16, 1960 C. J. SMITH ET AL 2,925,059
METHOD AND APPARATUS FOR MAKING CAN BODIES
Filed Feb. 19, 1957 11 Sheets-Sheet 5

Inventors
Clarence J. Smith
Peter Bogner
By: Olson & Trexler attys

United States Patent Office 2,925,059
Patented Feb. 16, 1960

2,925,059

METHOD AND APPARATUS FOR MAKING CAN BODIES

Clarence J. Smith and Peter Bogner, Rockford, Ill.; said Smith assignor to W. F. and John Barnes Company, Rockford, Ill., a corporation of Illinois Application February 19, 1957, Serial No. 641,195

26 Claims. (Cl. 113—120)

The present invention relates to a can making apparatus, and more particularly to a novel can body maker.

With can body makers now in general use, blanks are successively removed from a stack and intermittently fed by reciprocable means past a plurality of work stations including notching and slitting stations and a body forming station at which the blanks are formed into cylinders and at which side seams of the cylindrical bodies are bumped. At each of these work stations the blanks are stopped momentarily while work is being formed thereon and while the reciprocable feed mechanism is moving along its return stroke. A high rate of production is essential to the provision of economical cans, and one important feature limiting the rate of production of can body makers now in general use is the reciprocable motion of elements in such machines with resulting intermittent motion of the can body blanks and high stresses created in the machines. It is, therefore, an important object of the present invention to provide a novel can body maker wherein stresses as a result of reciprocable elements are largely eliminated and wherein the can body blanks either in separated form or as successive sections of a continuous strip are fed continuously past various work stations so as to obtain substantial improvements in efficiency and production rates.

A more specific object of the present invention is to provide a novel can body maker wherein can body blanks which are either separate or successive integral sections of a strip are successively received and then continuously gripped or located and fed past successive work stations at which various tools are disposed in a manner which permits them to engage the blanks while the blanks are moving continuously.

A still more specific object of the present invention is to provide a novel can body maker of the above described type wherein blank working tools such as notching, slitting, side seam folding and bumping tools are mounted for movement with the can body blanks or strip when they are in engagement with the blanks and are further mounted for movement around endless paths of travel so as to eliminate stresses such as those resulting from straight line reciprocable motion of corresponding tools in apparatus heretofore in general use.

A further object of the present invention is to provide a novel can body making apparatus which is constructed so that blanks either in separate or strip form moving continuously along a path of travel and certain tools also moving along said path of travel while engaging the blanks will be positively and accurately located with respect to each other to insure accurate working of the blanks.

A more specific object of the present invention is to provide a novel apparatus of the above described type wherein means including an endless chain is provided for continuously feeding the can body blanks either in strip or separate form, which apparatus is constructed so as to insure continuous uniform feeding of a series of separate or blank sections of a strip on one section of the chain in constant spaced relationship.

A further object of the present invention is to provide a novel method and apparatus for rapidly and continuously forming blanks either in separate or strip form into can bodies in a manner which insures the provisions of a product having substantially smooth cylindrical sides without sharp bends or flutes therein.

Still another specific object of this invention is to provide a method and apparatus adapted to form can bodies from a continuous strip of sheet material wherein locating apertures are formed in the strip and utilized for positively locating and feeding successive blank sections of the strip while such blank sections are successively formed into a tube.

Other objects and advantages of the present invention will become apparent from the following description and the accompanying drawings wherein:

Figure 1:
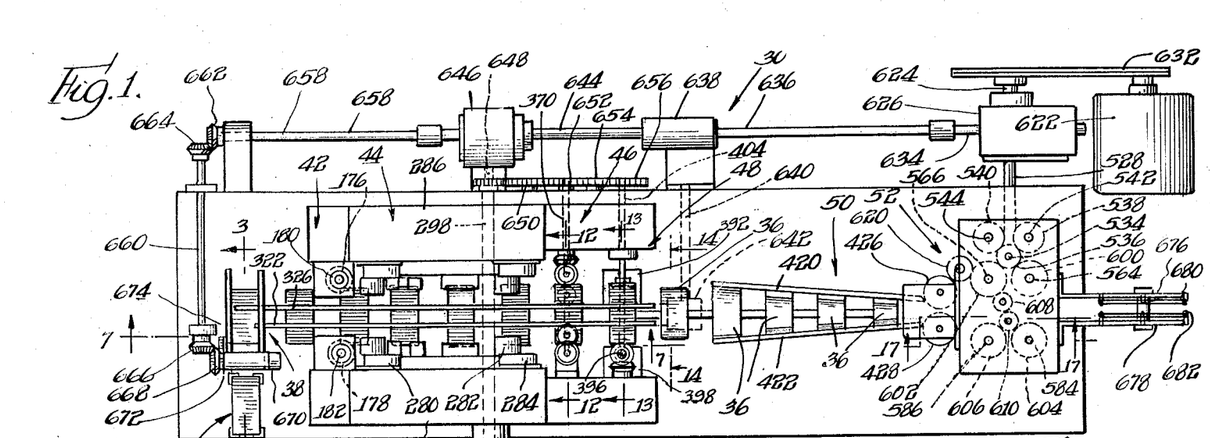
Fig. 1 is a simplified plan view of an apparatus constructed in accordance with the present invention.
Figure 2:
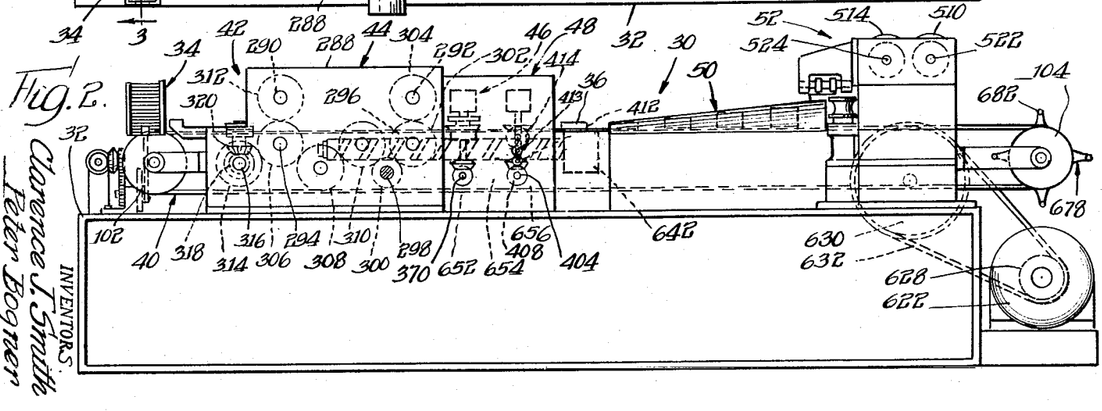
Fig. 2 is a simplified side elevational view of the apparatus shown in Fig. 1.

Referring now more specifically to the drawings wherein like parts are designated by the same numerals throughout the various figures, an apparatus 30 incorporating the features of the present invention is shown in somewhat simplified form in Figs. 1 and 2.

The apparatus includes an elongated horizontal frame 32 adjacent one end of which is mounted blank supply and feeding means 34 which directs flat can body blanks 36 successively from a stack to preflexing means generally designated by the numeral 38. Conveyor means 40 is disposed longitudinally of the frame for receiving blanks from the preflexing means 38 and continuously feeding the blanks past a plurality of work stations. At the first work station which is designated by the numeral 42, the opposite end edges of the blanks are knurled for promoting more secure side seams in the finished can bodies as will be understood, and at a second work station 44 the opposite end marginal portions of the blanks are notched, slit and partially folded in the manner described fully herein below. From the work station 44 the blanks pass a work station 46 at which the partially folded marginal portions are further folded or hooked, and then the blanks pass a work station 48 at which flux is applied to the folded marginal end portions. From the flexing station the blanks pass through a work station 50 in which the blanks are curled sufficiently to adapt them to pass into a side seam hooking and bumping work station 52.

Figure 3:
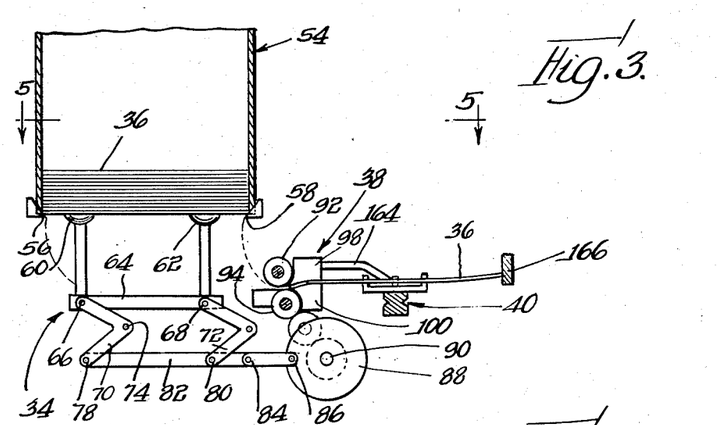
Fig. 3 is a simplified sectional view taken along line 3—3 in Fig. 1.
Figures 4, 5, 6:
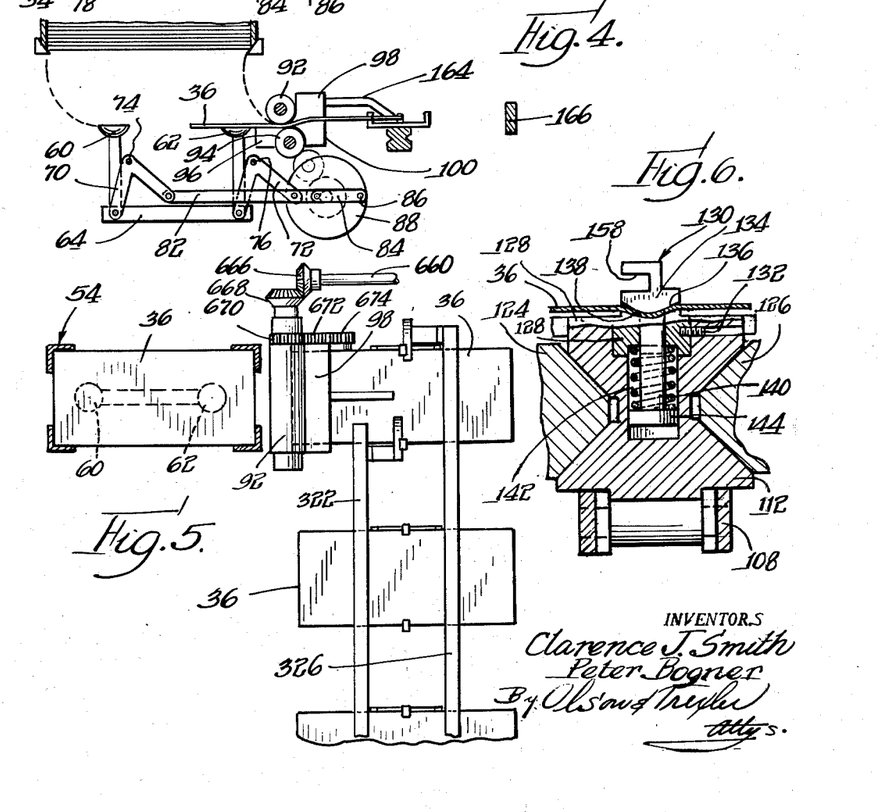
Fig. 4 is a sectional view similar to Fig. 3 but showing the manner in which blanks are fed from a supply stack.
Fig. 5 is a simplified sectional view taken along line 5—5 in Fig. 3.
Fig. 6 is an enlarged fragmentary sectional view taken along line 6—6 in Fig. 10.

As shown best in Figs. 3, 4 and 5, the blank supply and feeding means 43 incluldes an upstanding frame 54 adapted to contain a stack of the blanks 36. The bottommost blank in the stack is supported at its opposite ends by abutments 56 and 58 secured to the frame and a pair of suction members 60 and 62 are shiftably mounted for pulling the bottommost blank downwardly and snapping it between the abutments 56 and 58 and then delivering the blank from the stack to the flexing means 38. While the blank or sheet feeding means may be of various known constructions, the suction members are preferably mounted as shown in a somewhat diagrammatic manner so that they not only feed the blank downwardly but also laterally to the flexing means. More specifically, the suction members are fixed to a cross bar 64 which is pivoted as at 66 and 68 to arms of bell cranks 70 and 72 which are respectively mounted on fixed pivots 74 and 76. Opposite arms of the bell cranks are pivoted as at 78 and 80 to a connecting rod 82. Any suitable means may be provided for oscillating the connecting rod and thereby oscillating the suction members, which means may include a link 84 pivoted to the connecting rod and also pivoted as at 86 on an eccentric pin carried by a wheel 88 mounted on a driven shaft 90.

Figures 13, 14:
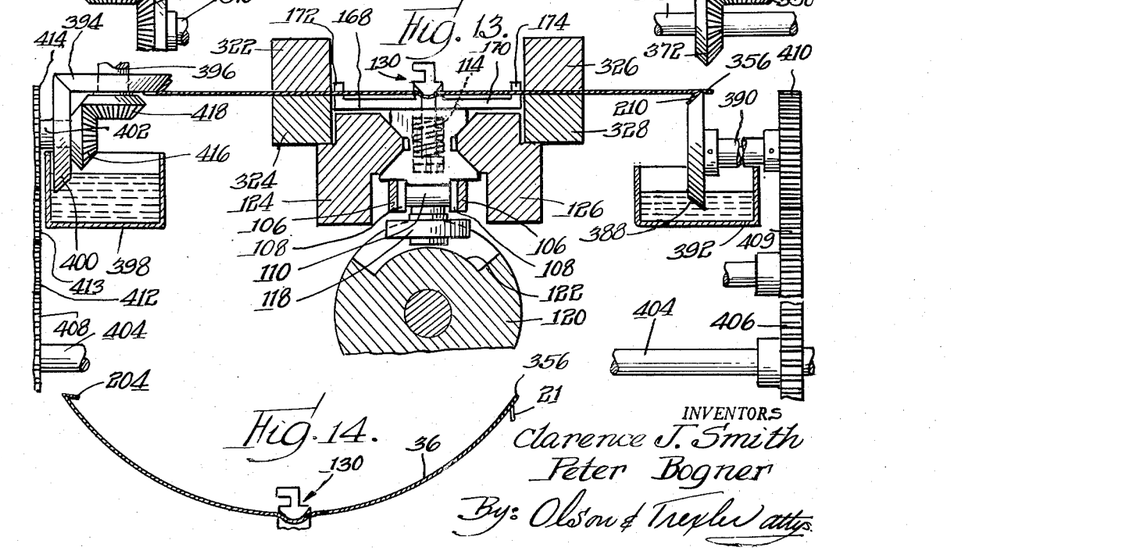
Fig. 13 is an enlarged fragmentary sectional view taken along line 13—13 in Fig. 1.
Fig. 14 is an enlarged fragmentary sectional view taken along line 14—14 in Fig. 1.

The flexing means 38 includes a pair of driven rollers 92 and 94 disposed for receiving therebetween a blank which is fed across a guide block 96 by the oscillating suction members. The rollers then grip and feed the blank through a pair of flexing irons 98 and 100 so that the blank is flexed in a manner which will be understood. It is important to note that the blank is permanently flexed to a relatively large degree, and Fig. 14 shows the normal flexed condition of a blank after it has passed through the flexing means 38. As will be discussed more fully hereinbelow, the blank should be flexed or curled sufficiently so that it may be subsequently formed into a cylindrical can body shape without substantial further cold working of the blank material or the formation of sharp bends or flutes in the blank. At the same time, the degree of flex of the blank should be such that the blank may be retained in a flattened condition by suitable guide means as it passes several of the work stations without cold working of the blank so that the blank will return to its flexed condition when it passes from beneath the guide means. As a specific example of the degree to which a blank should be flexed in accordance with the present invention, it has been found that a blank which is approximately eight and three-eighths inches long should be flexed so that its ends are deflected approximately two inches from the horizontal or, in other words, so that the radius of the arc of the flexed blank is about four inches.

The conveyor 40 comprises a pair of idler sprockets 102 and 104 respectively freely rotatably mounted adjacent opposite ends of the main machine frame 32 and an endless chain of pairs of links 106 and 108 joined by pins 110 encircling the sprockets. Blocks 112 are mounted on predetermined spaced pairs of links 106 and additional blocks 114 are carried by adjacent pairs of links 108 and are connected thereto by pins 115, which blocks respectively carry means to be described below for gripping trailing and leading edges of the blanks. In addition to the blank gripping means, the blocks 112 carry depending stub shafts 116 on which are rotatably mounted rollers 118. As shown in simplified form in Figs. 1 and 2 and in more detail in Figs. 7 and 10, a shaft 120 having a helical worm groove 122 formed therein is rotatably mounted beneath a portion of the upper run of the conveyor chain so that the worm groove is positioned for receiving successive rollers 118. The worm shaft is driven in the manner described below so that it functions to drive the conveyor chain through the cam followers or rollers 118. In addition, the worm shaft serves to locate positively the sections of the chain carrying the rollers engaged thereby and to maintain a predetermined spacing between the rollers and, therefore, the blank gripping means associated with the rollers whereby the blanks are positively and continuously conveyed in predetermined spaced relationship past certain of the work stations regardless of any amount of wear or slack in the conveyor chain. As indicated in a number of the figures including Figs. 11-13, 15 and 22, the blocks 112 and 114 are provided with longitudinally extending V-shaped grooves in their opposite sides cooperable with guide bars 124 and 126 which extend substantially the entire length of the upper run of the conveyor chain for securely and accurately supporting the blocks and, thus, the can body blanks carried thereby as they pass the various work stations.

Figures 10, 11:
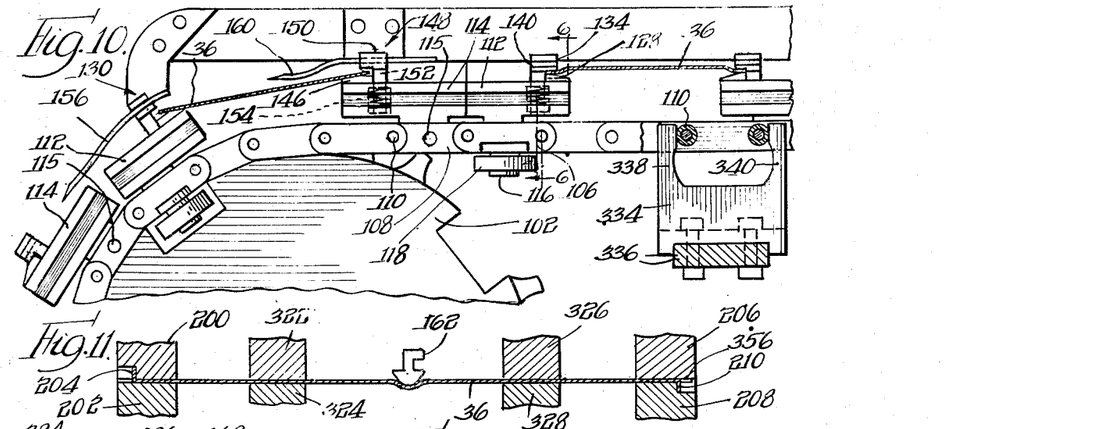
Fig. 10 is an enlarged fragmentary sectional view taken along much the same line as Fig. 7 and shows in greater detail the manner in which blanks are received and fed by a conveyor of the apparatus.
Fig. 11 is an enlarged fragmentary sectional view taken along line 11—11 in Fig. 7.

As shown best in Figs. 6 and 10, the blank gripping means carried by each block 112 is provided by an anvil member 128 adjustably fixed on the block 112 and a moveable and resiliently biased jaw member 130 carried by the anvil member. The anvil member is longitudinally adjustable in a slot provided in the block 112 so that the apparatus may be adjusted for accommodating blanks of different widths and any suitable means such as a set screw 132 inserted into one of a series of apertures in the side of the block 112 may be provided for locking the anvil member 128 in the desired adjusted position. The jaw member has a head portion 134 overlying the anvil member and having a rounded or somewhat V-shaped work engaging surface 136 complementary to a similarly shaped grooved surface 138 in the anvil member so that when a can body blank is gripped between these surfaces it will be slightly deformed in the manner shown in order to prevent it from slipping laterally. A shank section 140 of the jaw members depends from the head portion to an aperture in the anvil member and into a slot in the block 112, and a compression spring 142 is provided between the anvil member and an annular shoulder 144 on the shank portion for resiliently and firmly biasing the jaw member head toward the anvil member.

The gripping means carried by each of the blocks 114 is similar to the gripping means described above. Thus, an anvil member 146 is longitudinally adjustably fixed on the block 114 and carries a jaw member 148 having a work engaging head portion 150 and a depending shank portion 152 which is resiliently biased by a spring 154.

The manner in which the can body blanks are fed to the conveyor means 40 and initially engaged by the gripping means is shown in Figs. 3–5 and 10. It is to be noted that each jaw member 130 on a straight horizontal run of the conveyor chain and its cooperable leading jaw member 148 are spaced a predetermined minimum distance apart for properly engaging a blank therebetween. However, when the blocks 112 and 114 are moving along an arcuate path of travel around the sprocket 102, the blocks and the jaw members carried thereby are tilted with respect to each other so that the space between cooperable pairs of jaw members is increased sufficiently to permit a blank to be placed therebetween. Thus, the flexing means 38 is located so that blanks fed therefrom by the rollers 92 and 94 will be fed rapidly between cooperable pairs of jaw members that are spread apart as they pass around the sprocket. In addition, the jaw members are raised or opened so that edges of the blank may pass beneath their respective head portions when the jaw members are relatively shifted toward each other upon passing from the sprocket 102 to the straight upper run of the conveyor. This is accomplished by providing a fixed cam member 156 mounted for entering a slot 158 in a side of the head portion of the jaw member 130 and by providing a somewhat similar fixed cam member 160 disposed for entering a slot 162 in a side of the head portion of the jaw member 148. Suitable guide means 164 is provided for holding down the leading edge of a blank emerging from the flexing means 38 sufficiently to prevent the blank from interfering with the cam members 156 and 160. It will be appreciated that when a blank is fed to the position shown in Figs. 3 and 10 and located in this position by the guide means and a stop member 166, further movement of the conveyor chain will cause the cooperable jaw members to move toward each other so that their respective head portions overlap the margins of the blank whereupon the head portions become disengaged from the cam members 156 and 160 and snapped into engagement with the blank. The blank is then securely carried forward by the gripping means, and it is to be noted that the anvil member 128 carries laterally projecting arms 168 and 170 having upstanding abutments 172 and 174, respectively, as shown in a number of views including Fig. 15 for engaging the trailing edge of the blank and insuring proper positioning of the blank transversely of the conveyor.

At the first work station 42 knurling rollers 176 and 178 are disposed at opposite sides of the conveyor for engaging opposite end edges of the blanks. These rollers are respectively mounted on vertical rotatable shafts 180 and 182 which are driven in timed relationship with the conveyor in the manner described below.

Figure 16:
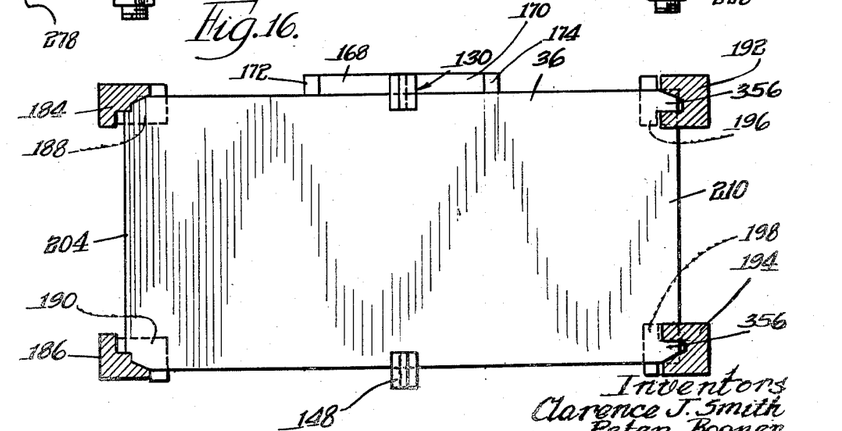
Fig. 16 is a fragmentary sectional view taken along line 16—16 in Fig. 15.

At a first location in the work station 44, upper dies 184 and 186 and cooperable lower dies 188 and 190 are provided for notching corners of one and of successive blanks and another pair of upper dies 192—194 and lower dies 196—198 are provided for slitting and notching the opposite end of successive blanks in the manner shown best in Fig. 16. At a second portion of the work station 44 additional cooperable upper and lower dies 200 and 202 are provided for folding an end marginal portion 204 of successive blanks which have been previously notched upwardly substantially 90° as shown best in Fig. 11. At the same time other cooperable upper and lower die members 206 and 208 function to fold an opposite marginal end portion 210 of successive blanks which have been previously slit and notched substantially 90° downwardly also as shown best in Fig. 11.

It is important to note that the various notching, slitting and folding dies mentioned above are mounted for movement along endless paths of travel and for movement with the continuously advancing blanks while they are engaging and working upon the blanks. Referring particularly to Figs. 1, 2, 7 and 15, the lower dies 196, 198 and 208 are respectively carried by suitable tool holding means 212, 214 and 216 mounted on a cross head 218. Hub means 220 and 222 having suitable bearings therein are respectively secured to opposite ends of the cross head 218 and are carried by eccentric pins or stub shafts 224 and 226 of crank members 228 and 230. These crank members are respectively secured on rotatably driven shafts 232 and 234 indicated in Fig. 7, which shafts are driven in unison so that the cross head 218 and the dies carried thereby are continuously moved along a generally elliptical endless path of travel. It will be appreciated that as the dies move from a lower portion of their paths of travel to an upper portion of the paths of travel they will approach a blank on the conveyor chain and then engage and move along with the blank while work is being performed on the blank and then recede from the blank. The crank members respectively include weighted portions 236 and 238 offset oppositely from the eccentric pins so that the assembly including the cranks, the cross head and the dies is dynamically balanced.

Figure 15:
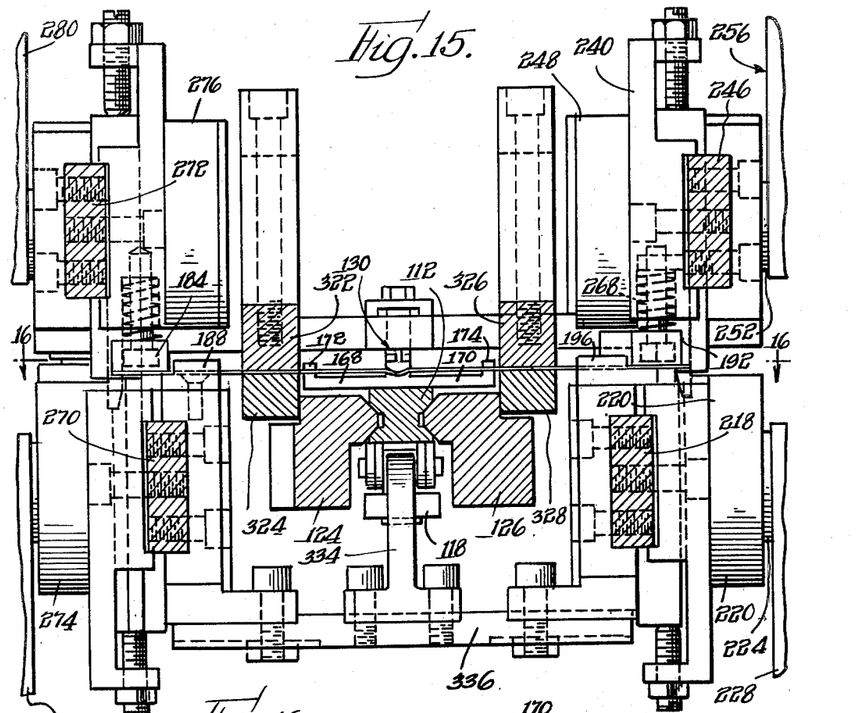
Fig. 15 is a fragmentary sectional view taken along line 15—15 in Fig. 7.

The upper dies 192, 194 and 206 are respectively carried by tool holders 240, 242 and 244 which are secured to another cross head 246 disposed above the conveyor and the above mentioned cross head 218. The cross head 246 is also secured at its opposite ends to hub means 248 and 250 mounted on eccentric stub shafts 252 and 254 of crank members 256 and 258. These crank members are respectively mounted on shafts 260 and 262 which are driven in unison with the lower crank shafts 224 and 226. The upper crank members are also provided with offset weighted portions 264 and 266 so that the assembly including the cranks 256 and 258, the cross head 246 and the dies carried thereby is also dynamically balanced. As shown in Fig. 15 the upper die member 192 is vertically shiftably carried by the tool holding means 240 and is yieldably biased downwardly to an operative position by a spring 268 so as to avoid injury to the mechanism in the event of undue interference with the lower cooperable die member. All of the other upper die members are also preferably yieldably biased in much the same manner.

The other lower dies 188, 190 and 202 and their cooperable upper dies 184, 186 and 200 are supported and moved around generally elliptical endless path of travel by means identical to but oppositely disposed from the crank and cross head means described above. Thus, this additional means need not be shown or described in detail, but in Fig. 15 lower and upper cross heads 270 and 272 are partially shown, which cross heads respectively have one of their ends secured to hub means 274 and 276 carried by eccentric pins of crank members 278 and 280. In Fig. 1 the opposite end of the upper cross head 272 is also shown, which end of the cross head is secured to hub means 282 carried by the eccentric pin or stub shaft of a crank member 284.

Means for driving the above described sets of crank and cross head assemblies at opposite sides of the conveyor are substantially identical and are respectively supported within housings 286 and 288 at opposite sides of the conveyor. Fig. 2 shows the drive means within the housing 288. The upper crank members 280 and 284 are carried by shafts 290 and 292 and the lower crank member 278 and its associated lower crank member which is not shown are respectively mounted on shafts 294 and 296. A drive shaft 298 traverses the apparatus and is driven by the means described below, which shaft carries a pinion 300 which drives a gear 302 keyed or otherwise secured to the crank shaft 296. The gear 302, in turn, drives a gear 304 secured to the upper crank shaft 292. The pinion 300 also drives a gear 306 on the other lower crank shaft 294 through idler gears 308 and 310. The gear 306, in turn, meshes with and drives a gear 312 secured to the upper crank shaft 290. The gearing means in the housing 286 for driving the crank shafts 252, 254, 224 and 226 is identical to the gearing shown in Fig. 2 and is driven by a pinion, not shown, also fixed on the drive shaft 298 whereby all of the crank members are driven in timed relationship with respect to each other. It will be noted that the gearing just described also provides a drive for the shafts of the knurling rollers 176 and 178. More specifically, the gear 306 meshes with and drives a gear 314 mounted on a shaft 316. A bevel gear 318 also mounted on a shaft 316 meshes with and drives a bevel gear 320 secured to the shaft 182 of the knurling roller 178. Identical means is provided for driving the knurling roller 176.

Figures 7, 8, 9:
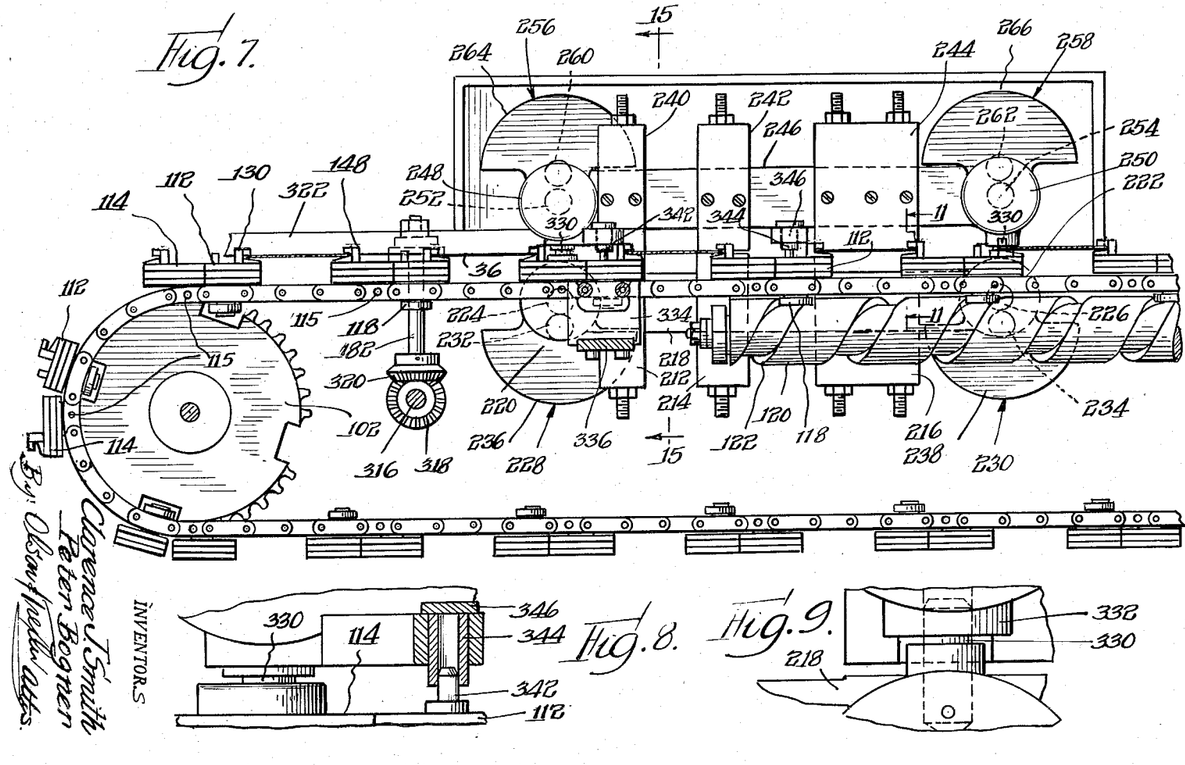
Fig. 7 is an enlarged fragmentary sectional view taken generally along line 7—7 in Fig. 1.
Fig. 8 is an enlarged fragmentary sectional view showing a portion of means for positively and accurately locating upper and lower sets of tools shown in Fig. 7 with respect to a blank.
Fig. 9 is an enlarged fragmentary elevational view showing an additional portion of the tool locating means.

The operation of the mechanisms at the work stations 42 and 44 is as follows. Blanks in a flexed or curled condition are continuously advanced with the conveyor at a predetermined uniform rate from the blank receiving or loading station over the conveyor sprocket 102 and are passed between pairs of cooperable upper and lower guide rails 322—324 and 326—328 which are supported for holding the blanks in a flattened condition. The blanks then successively pass between the knurling rollers 176 and 178 which are driven in timed relationship with the conveyor chain and so that they have a peripheral speed equal to the lineal speed of the conveyor. Then as each blank leaves the knurling rollers it passes between the upper and lower dies 184 through 198, which dies are also moved in timed relationship with the conveyor and at the same lineal speed of the conveyor so that they will spread apart to permit entry of a blank therebetween and then move together and move with the blank longitudinally of the apparatus so as to notch and slit the blank in the manner shown in Fig. 16. In order to insure that the upper and lower dies will be in proper alignment with each other when they come together, a locating pin 330 shown in Figs. 7 and 8 is secured to the hub member 222 and is adapted to enter a cooperable bushing 332 on the hub member 250. A similar locating pin and bushing, not shown, are respectively mounted on the other lower and upper adjacent hub members.

It is also important to locate the blanks positively and accurately with respect to the notching and slitting dies regardless of any wear or slack in the conveyor chain. This is accomplished by first approximately locating the links of the conveyor with respect to the dies by means of a member 334 shown in Figs. 7 and 10. This member is secured to and carried by a bar 336 extending between and having its opposite ends fastened to the opposed lower cross head members 218 and 270. Thus, the locating member 334 moves with the cross head members and into and out of engagement with the chain, which engagement is provided by a pair of upstanding fingers 338 and 340 of the member 334 which function to receive and retain therebetween a pair of the cross pins of the chain so that these cross pins and the chain links and can body blank supporting means adjacent thereto will be located with respect to the member 334. Final and more accurate locating of the blanks with respect to the notching and slitting dies is accomplished by providing upstanding locating pins 342 on the blank supporting blocks 112, which pins are adapted to enter cooperable bushings 344 carried by members 346 extending between and secured to the upper crank assemblies.

After the notching and slitting operation has been completed, continued movement of the conveyor and the crank assemblies advances the blank from the notching and slitting dies to a position between the upper and lower folding dies 200—202 and 206—208. During the next movement of the crank assemblies and dies toward each other, the folding dies bend the opposite marginal end portions 204 and 210 of the blank, respectively, upwardly and downwardly as shown in Fig. 11.

Figure 12:
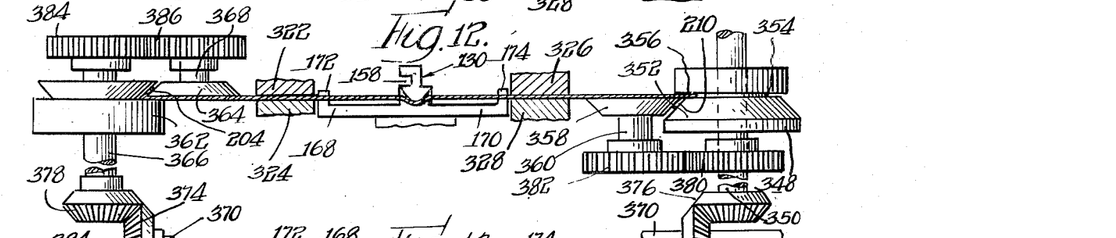
Fig. 12 is an enlarged fragmentary sectional view taken along line 12—12 in Fig. 1.

The mechanism at the work station 46 includes a folding roller 348 carried by a vertical and rotatable shaft 350. This roller is provided with a bevelled surface 352 for bending or folding the downwardly extending end portion 210 of successive blanks diagonally inwardly as shown in Fig. 12. An annular recess 354 is provided in this roller for accommodating projecting tabs 356 of the blanks which are not to be folded. A complementary bevelled roller 358 mounted on a shaft 360 is provided for backing up the marginal blank portion 210 during the folding operation so as to insure bending of the blank sharply and accurately. Similar but reversely disposed folding rollers 362 and 364, respectively, carried by shafts 366 and 368 are provided for completing the folding of the opposite blank end portion 204 as shown in Fig. 12. The folding rollers are driven from a shaft 370 which, in turn, is driven in the manner described below so that their peripheral speeds are substantially equal to the lineal speed of the conveyor. Bevelled gears 372 and 374 are provided on the shaft 370, respectively, for driving complementary bevelled gears 376 and 378 on the roller shafts 350 and 366. The roller shaft 360 is driven from the shaft 350 through cooperable gears 380 and 382 and the roller shaft 368 is driven from the shaft 366 by cooperable gears 384 and 386.

As will be understood, the side seams of finished can bodies are soldered in a manner, not shown, and in order to facilitate the soldering operation, flux is applied to the diagonally folded end portions 204 and 210 of successive blanks at the work station 48. The mechanism for accomplishing this is shown in Figs. 1, 2 and 13 and includes a wiping roller 388 mounted on a shaft 390 for engagement with the end portion 210 of successive blanks. A container 392 adapted to receive suitable fluxing material is positioned for supplying flux to the roller 388. At the opposite side of the apparatus another wiping roller 394 is carried by a vertically disposed shaft 396 for engaging the end portion 204 of successive blanks. Flux is applied to the roller 394 from a container 398 by a transfer roller 400 carried by a shaft 402. The fluxing rollers are driven so that their peripheral speed is substantially equal to the lineal speed of the conveyor. More specifically, these rollers are driven from a shaft 404 which, in turn, is driven in the manner described below and which carries gears 406 and 408. The gear 406 meshes with idler 409 which drives a gear 410 on the shaft 390. The gear 408 drives idler gears 412 and 413 which, in turn, drive a gear 414 on the shaft 402. As shown best in Fig. 13, the shaft 402 carries, in addition to the transfer roller 400, a bevel gear 416 which drives a complementary bevel gear 418 on the shaft 396.

Shortly after the fluxing station, the guide bars 322—324 and 326—328 function to hold the blanks in a flattened condition terminate so that the blanks are permitted to spring back to their flexed or curled condition as shown in Figs. 1, 2 and 14. Then as the blanks are advanced to the work station 50, they enter between a pair of oppositely disposed converging guides or plows 420 and 422 which progressively increasingly flex the blank toward a generally cylindrical shape as indicated in Figs. 1, 2, 17, 19 and 20. It is, again, to be noted that the blanks are pre-flex or curled sufficiently at the initial flexing station 38 so that they may be further flexed or curled into cylindrical shapes without cold working of the blank material beyond its elastic limit. In other words, if the blank in the condition shown in Fig. 19 or even in Fig. 23 were permitted to uncoil, it would return substantially to the condition shown in Fig. 14.

From the plows at the work station 50, the blanks successively pass to the side seam hooking and bumping work station in which the mechanism shown in Figs. 1, 2, 17, 18 and 20 through 26 is located. This mechanism comprises a pair of rollers 426 and 428 adapted to complete the flexing of the can bodies so that their end portions 204 and 210 are hooked together, a horn 430 adapted to expand within successive can bodies for drawing the hooked end portions together and a hammer or bumping tool 432 adapted to bump the side seams of successive can bodies when the horn is expanded, which horn and bumping tool are mounted for movement with the continuously advancing can bodies during the bumping operation. The horn is supported only at one end adjacent the entering end of the work station 52 by a narrow plate member 434 depending from a carriage 436, which carriage is mounted on a pair of rods 438 and 440 slidably disposed in suitable bearings 442—444 and 446—448 in frame means 450. As shown in the drawings the rollers 426 and 428 are located so as to engage successive can body blanks after they have substantially passed the horn support member 434. The rollers form successive blanks around the horn and so that their margins are in overlapping relationship as shown best in Fig. 23.

Figure 21:
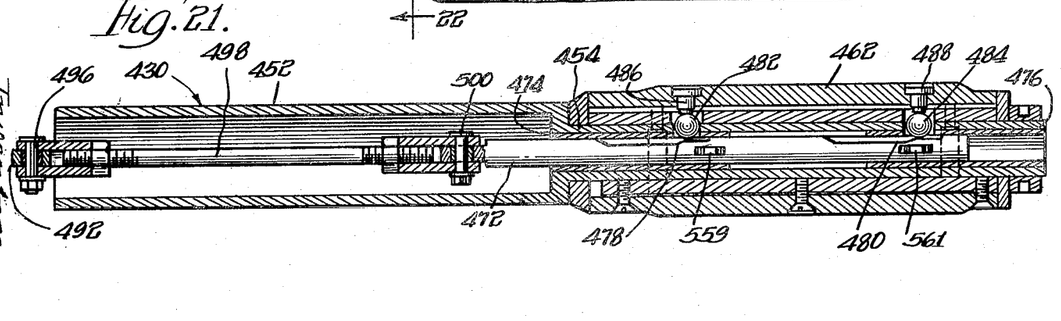
Fig. 21 is a horizontal cross sectional view taken along line 21—21 in Fig. 17.
Figures 22, 24, 25:
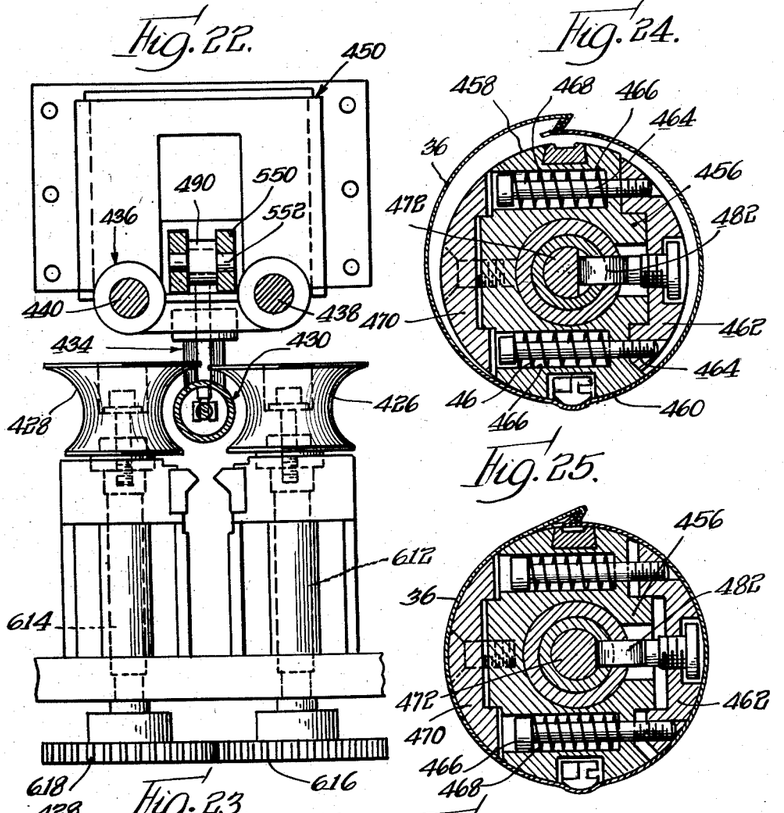
Fig. 22 is a fragmentary sectional view taken along line 22—22 in Fig. 20.
Fig. 24 is a sectional view taken along line 24—24 in Fig. 17 and shows a hooked can body around the horn before the horn has been expanded.
Fig. 25 is similar to Fig. 24 but shows the horn in an expanded condition.

As shown best in Figs. 21, 24 and 25, the horn includes a first rigid tubular body portion 452 and a second integral or rigidly connected tubular portion 454 of reduced internal and external diameters. A body member 456 is telescoped over and secured to the tubular portion 454 and is provided with opposite peripheral surfaces 458 and 460 which are segments of a cylinder having a diameter substantially equal to the inside diameter of a can body to be formed. A radially expandable cylinder segment 462 is connected to the body member 456 by a plurality of screws 464 each of which is slidably disposed in one of a plurality of transverse bores 466 in the body member. Springs 468 are provided for biasing the screws 464 so that the segment 462 is normally retained in a collapsed condition as shown in Fig. 24. Oppositely from the shiftable segment 462 a cylinder segment 470 is fixed to the body member 456 for completing the substantially cylindrical formation of the horn.

The expandable segment 462 is actuated by means of a cam bar 472 axially slidable within bearings 474 and 476 mounted within the tubular portion 454. The rod or bar 472 is provided with a pair of cam surfaces 478 and 480 respectively adapted to actuate roller elements 482 and 484 which, in turn, actuate the cylindrical segment through wear resisting pins 486 and 488. In order to actuate the cam rod 472, a bell crank having angularly disposed arms 490 and 492 is pivotally mounted as at 494 on the horn carriage 436, see Fig. 17. The arm 492 is pivotally connected as at 496 to a connecting rod 498 which, in turn, is pivotally connected to the cam rod as at 500. Means described below is connected to the bell crank arm 490 for actuating the bell crank.

Figure 17:
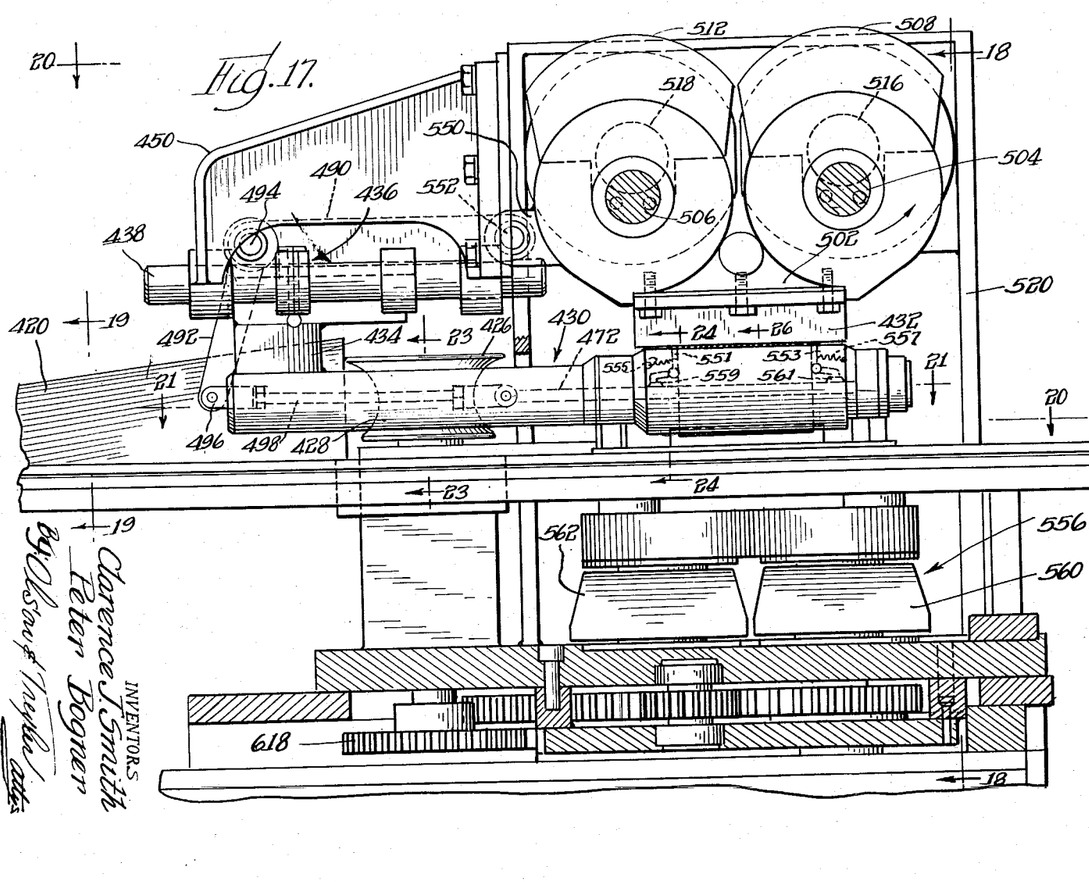
Fig. 17 is an enlarged fragmentary sectional view taken along line 17—17 in Fig. 1.
Figures 18, 19:
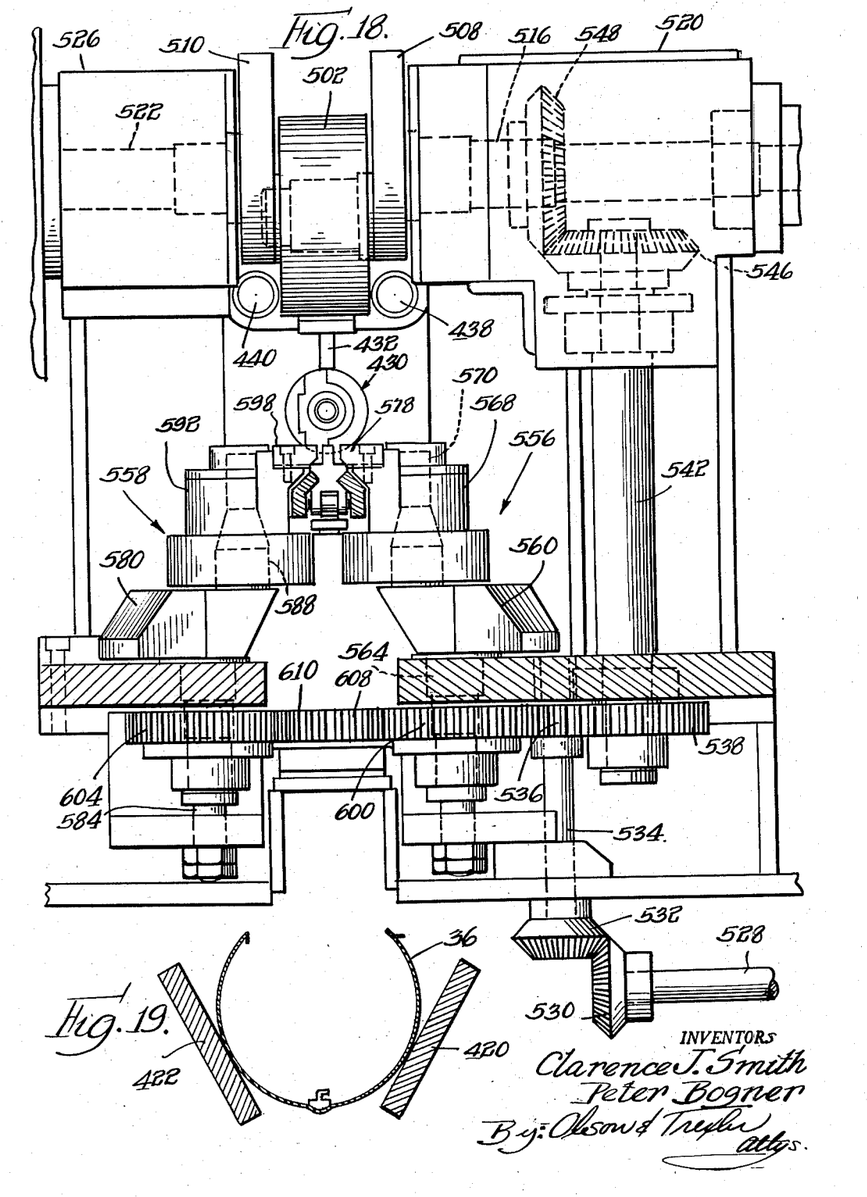
Fig. 18 is a fragmentary cross sectional view taken along line 18—18 in Fig. 17.
Fig. 19 is a fragmentary sectional view taken along line 19—19 in Fig. 17.

The bumping tool 432, like the dies described above, is moved continuously around a generally elliptical path of travel. Thus, the tool 432 is secured to a head member 502 having its opposite ends mounted on eccentric shaft means 504 and 506 respectively extending between pairs of aligned crank members 508—510 and 512—514, see Figs. 2, 17 and 18. The crank members 508 and 512 are respectively mounted on shafts 516 and 518 rotatably supported by suitable bearing means in a frame structure 520, and the crank members 510 and 514 are mounted on shafts 522 and 524 supported in frame means 526. As shown in Figs. 1 and 18, this crank assembly is driven from a drive shaft 528 which carries a bevel gear 530 meshing with a complementary gear 532 on a short shaft 534. The shaft 534 also carries a pinion 536 which meshes with and drives spur gears 538 and 540 on lower ends of upstanding shafts 542 and 544, respectively. As shown in Fig. 18 a bevel gear 546 is secured to the upper end of the shaft 542 and meshes with a bevel gear 548 on the crank shaft 516 for driving this shaft. Similar cooperable bevel gears, not shown, are provided on the upstanding shaft 544 and the crank shaft 518, respectively.

Figure 23:
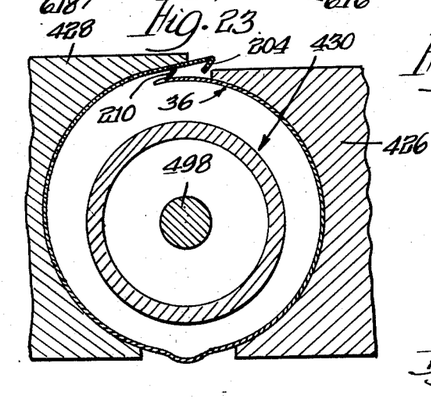
Fig. 23 is an enlarged fragmentary sectional view taken along line 23—23 in Fig. 17.
Figure 26:
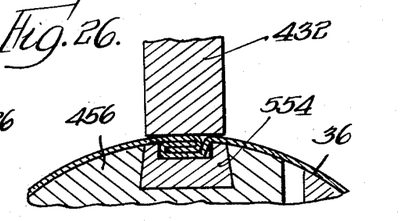
Fig. 26 is a fragmentary enlarged sectional view taken along line 26—26 in Fig. 17 and showing the manner in which the can body side seam is bumped.

The horn is actuated in timed relationship with the bumping tool, and this is accomplished by connecting the free end of the bell crank arm 490 with a lug 550 secured to the crank assembly head member 502. This connection is shown best in Fig. 17 wherein suitable pin means 552 is provided for pivotally connecting the bell crank arm 490 and the lug 550. It will be appreciated that the pivot pin 552 will move with the crank assembly head along a generally elliptical path of travel. As a result the bell crank will be oscillated about its pivot 494 for actuating the horn cam rod and thereby expanding and contracting the horn, and at the same time, the horn carriage and, thus, the horn will be reciprocated longitudinally of the conveyor. The crank assembly at the work station 52 is driven in timed relationship with the conveyor so that as a can body blank having its opposite end margins hooked as shown in Figs. 23 and 24 approaches the expandable portion of the horn, the horn is in a retracted position and a radially collapsed condition and the bumping tool is in a raised position. Further movment of the conveyor and the crank assembly at this work station brings the can body into full telescopic association with the expandable portion of the horn whereupon the bell crank is pivoted in a clockwise direction as viewed in Fig. 17 for shifting the cam bar 472 axially rearwardly with respect to the horn for expanding the horn as shown in Figs. 21 and 25 and, at the same time, the bell crank and, thus, the horn are moved bodily forwardly relative to the conveyor so that the expanded horn moves forwardly with the can body blank without substantial sliding frictional contact therebetween. Also at the same time, the bumping tool 432 moves downwardly into engagement with the side seam as shown in Figs. 17 and 26 for completing the formation of the side seam. It is also to be noted that the bumping tool 432 moves forwardly along with the can body so as to avoid sliding frictional contact therewith. Preferably, the horn includes a recessed anvil member 554 into which the hooked side seam portions of the can body blanks are compressed as shown in Fig. 26. Furthermore, pivoted bell crank fingers 551 and 553 (see Fig. 17) are mounted in slots in the horn for engaging and squaring, if necessary, opposite ends of the blank. These fingers are normally retracted by springs 555 and 557 and are shifted into engagement with the blank by cam lobes 559 and 561 on the rod 472 just prior to expansion of the horn and bumping of the side seam.

Figure 20:
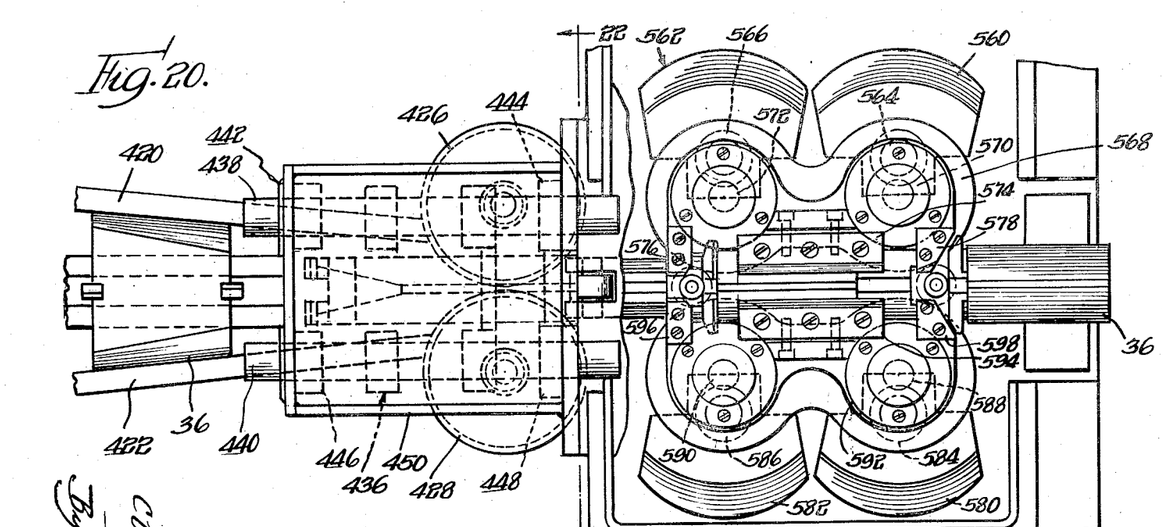
Fig. 20 is a view taken generally along line 20—20 in Fig. 17.

As will be understood, a considerable downward thrust will be imparted to the horn by the bumping tool, which thrust cannot readily be sustained by the above described horn support means. Thus, additional support means shown in Figs. 17, 18 and 20 is provided for supporting the horn directly beneath the bumping tool. This support means comprises a pair of crank assemblies 556 and 558 mounted for movement in a horizontal plane. More specifically, the crank assembly 556 comprises a pair of crank members 560 and 562 respectively carried by vertical shafts 564 and 566. A head member 568 is mounted on eccentric pins 570 and 572 of these crank members. A first support pad 574 is mounted on the head member 568 and is adapted to project beneath and engage a can body blank on the horn. In order to prevent possible marring of the can body blank by preventing the full force of the bumping tool thrust from being transmitted through the blank to the support pad 574, additional support pads 576 and 578 are mounted on the head member 568. These additional support pads are positioned for direct engagement with the horn beyond opposite ends of a blank on the horn while the blank is having its side seam bumped.

The crank assembly 558 is identical to but oppositely disposed from the crank assembly 556. Thus, the assembly 558 includes a pair of crank members 580 and 582 on vertical shafts 584 and 586. Eccentric pins 588 and 590 of these crank members carry a head member 592 on which is mounted a relatively long can body engaging support pad 594 and opposite end horn engaging support pads 596 and 598.

Referring particularly to Figs. 1 and 17 it is seen that the shafts 564 and 566 of the crank assembly 556 are driven from the pinion 536 by spur gears 600 and 602 meshing with the pinion and respectively secured to the lower ends of these shafts. The lower ends of the shafts 584 and 586 of the crank assembly 558 carry similar spur gears 604 and 606 which are driven from the gear 602 through idler gears 608 and 610. The body hooking rollers 426 and 428 are also driven from the gear 602. More specifically, as shown in Figs. 1 and 22, these rollers are carried on the upper ends of shafts 612 and 614 to which meshing gears 616 and 618 are also connected. The gear 616 is driven from the gear 602 through an idler gear 620. Thus, all of the elements at the hooking and bumping station are driven in timed relationship with respect to each other. It is also important to note that all of the crank members of the crank assemblies at the hooking and bumping station include offset weighted counterbalancing portions which are formed so that the mechanism including the crank assemblies and the horn is dynamically balanced. This, of course, enables the apparatus to be operated at high speeds without the creation of undue stresses.

Various suitable means may be provided for driving the conveyor and the mechanisms at the different work stations in timed relationship with respect to each other. In the embodiment shown in Figs. 1 and 2 this means includes a motor 622 which drives an input shaft 624 of a transmission 626 by pulleys 628 and 630 and a drive belt 632. The drive shaft 528 for the mechanism at the work station 52 is suitably connected with and driven from the transmission 626. Another output shaft 634 extends from the transmission and is coupled with a shaft 636 which drives a second transmission 638. The conveyor driving worm shaft is driven from the transmission 638 by a laterally extending shaft 640 that extends to a gear box 642 which is also connected with the worm shaft. Another shaft 644 extends between the transmission 638 and a transmission 646 to which the drive shaft 298 of the slitting and folding mechanism at the work station 44 is coupled. The drive shaft 370 for the folding rollers at the work station 46 is driven from the shaft 298 through gears 648, 650 and 652, and the drive shaft 404 for the fluxing rollers is driven from the gear 652 through gears 654 and 656.

Further longitudinally extending drive shaft means 658 extends from the transmission 646 and drives a transversely disposed shaft 660 through bevel gears 662 and 664. Another bevel gear 666 on the shaft 660 meshes with a complementary gear 668 on the flexing roller 92, which roller also carries a gear 670 which meshes with and drives a similar gear, not shown, on the flexing roller 94. The shaft 90 of the blank or sheet feeding means is driven from the roller 94 by means of a gear 672 meshing with the gear on this roller, and also meshing with a gear 674 on the shaft 90.

It will be appreciated that as each cooperable pair of blank supporting blocks 112 and 114 carrying a can body starts around the sprocket means 104, the leading block 114 will advance with respect to the block 112 so as to disengage its blank gripping means from the body. Suitable guide means, not shown, is provided for receiving the can body blank prior to its release by the gripping means on the block 114. Then the can body is delivered from the gripping means carried by the block 112 and advanced to a position from which it will be carried by conveyor means, not shown, through additional processing apparatus such as a side seam soldering unit or to any desired location. This is accomplished by providing a pair of spiders 676 and 678 (see Figs. 1 and 2) mounted for rotation with the sprocket 104, which spiders respectively carry pins 680 and 682 at the outer ends of their arms adapted to engage a trailing edge of a can body. Since the arms of the spiders have a radius greater than the radius of the sprocket 104, the lineal speed of the pins is greater than the lineal speed of the conveyor chain so that the pins will be effective to push successive can bodies forwardly and out of the grasp of the gripping means carried by successive blocks 112.

Figure 27:
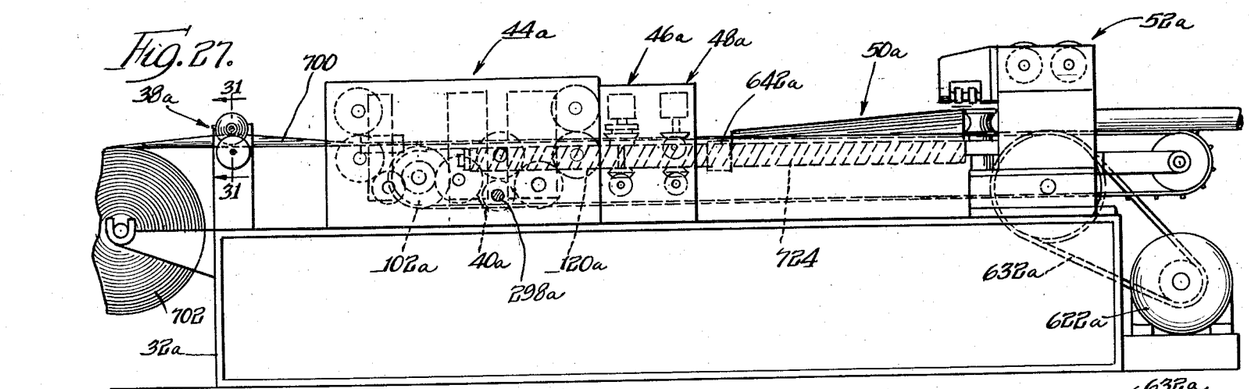
Figs. 27, 28, 29, 30 and 31 are views showing a modified form of the present invention.
Figure 28:
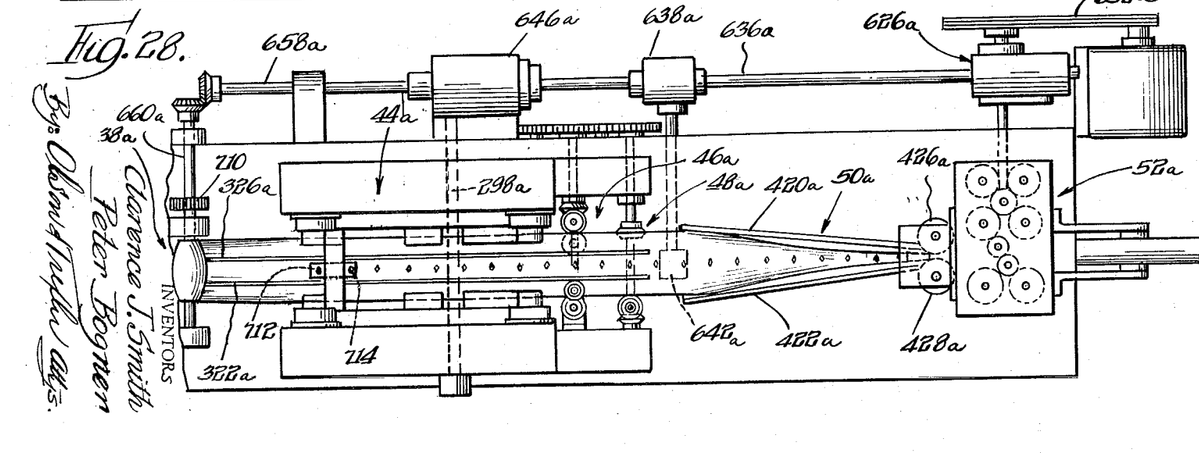
Figures 29, 30, 31:
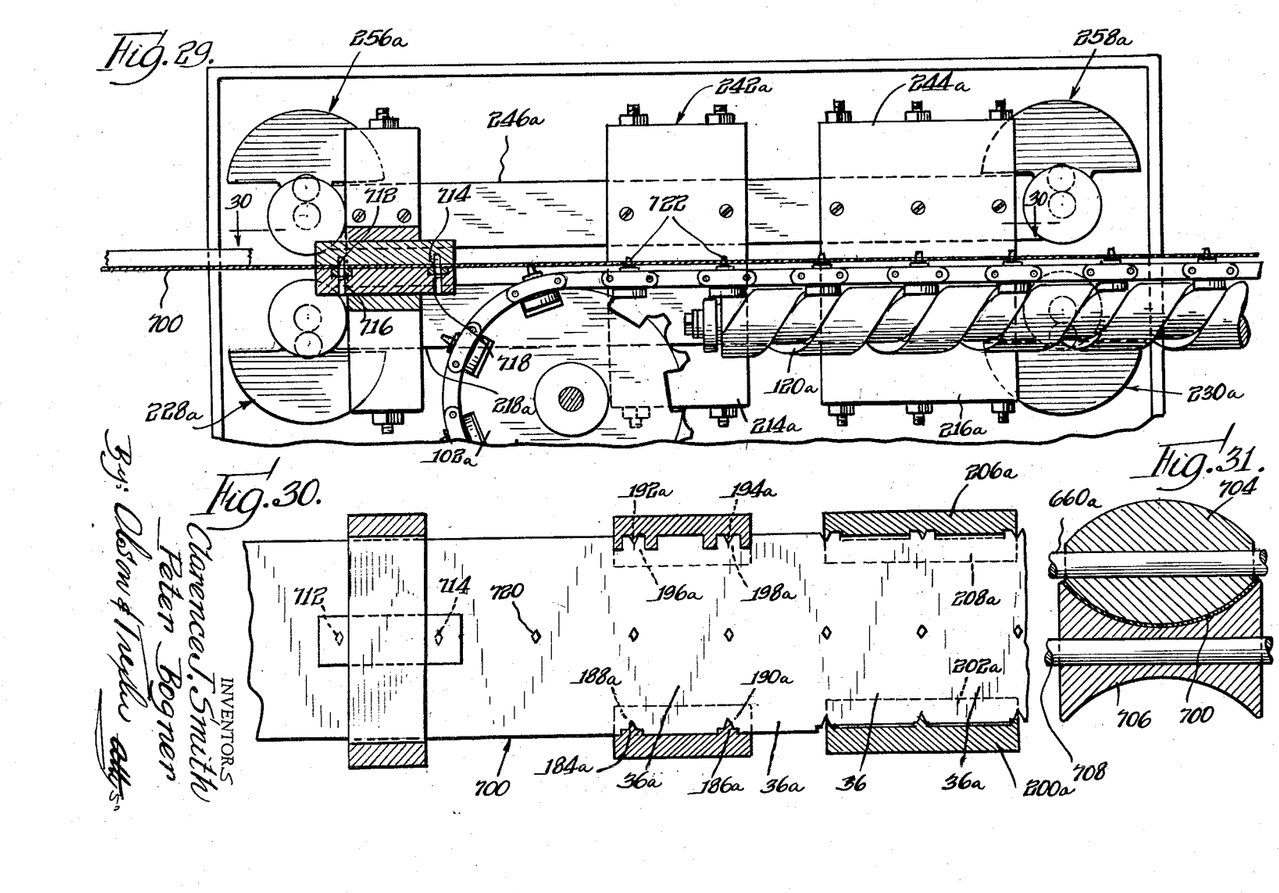

Referring now to Figs. 27 through 31, there is shown a modified form of the present invention which is similar to the above described apparatus as indicated by the application of identical reference numerals with the suffix "a" added to corresponding elements. In this embodiment the apparatus is modified so that it is adapted to accommodate successive can body blanks in the form of an elongated continuous strip of sheet material. More specifically, an elongated strip 700 of sheet material is fed into the apparatus from a supply roll 702 suitably supported adjacent the end of the main machine frame 32a. The strip is fed first through the preflexing mechanism 32a which in this embodiment comprises a rounded convex roller 704 mounted on the shaft 660a and a complementary roller 706 having a concave surface mounted on a shaft 708 as shown in Figs. 27, 28 and 31, which shaft 708 is driven from the shaft 660a by gears mounted on these shafts and generally designated by the numeral 710 in Fig. 28. The preflexed strip then passes beneath the guide rods 322a and 326a and enters the work station 44a. The crank assembly mechanism at the station 44a is essentially identical to the corresponding mechanism described above except that it is elongated and disposed so that it extends rearwardly of the conveyor sprocket 102a. These crank assemblies carry tools similar to the tools on the corresponding crank assemblies described above except that as shown in Fig. 30 these tools are modified so as to slit, notch, and fold marginal portions of a plurality of can body blank sections of the strip at one time. More specifically, the notching and slitting tools are adapted to notch and slit all corners of one blank section disposed therebetween and at the same time notch and slit adjacent corners of a pair of blanks at the opposite sides of the first mentioned blank, and the tools 200a—202a and 206a—208a are adapted to fold the margins of a pair of adjacent blank sections of the strip. It is to be noted that the driving means is constructed so that the conveyor advances the strip 700 a distance equal to the combined length of two of the blank sections during each revolution of the crank assemblies at the work station 44a.

In addition to the tools mentioned above, the crank assemblies at the station 44a carry on tool holders extending transversely therebetween a pair of punches 712 and 714 and cooperable dies 716 and 718, which additional tools are adapted to punch small preferably diamond shaped apertures 720 in the strip 700. These apertures are located so that they are bisected by lines along which the strip will be subsequently cut when it is separated into individual can bodies, and the apertures are sufficiently small so that the notches provided thereby in the ends of finished can bodies are similar to the notches provided by the tools 184a—190a and therefore will not interfere with the satisfactory application of end closures to the can bodies. In this embodiment the conveyor is modified in that the can blank gripping means described above is replaced by a series of pins 722 having diamond shaped cross sections, and the apertures 720 are provided in the strip for receiving the pin 722 so that the conveyor will positively engage, locate and feed successive can body blank sections of the strip.

The strip 700 emerging from the work station 44a passes through the work stations 46a, 48a and 50a which include the mechanisms at the corresponding work stations described above. Then the strip passes through the work station 52, and the mechanism at this work station is also substantially identical to the corresponding mechanism described above except that the drive means therefor is modified so that the crank assemblies make one complete revolution during the advancement of each successive can body blank section or increment of the strip 700 as distinguished from the above described structure wherein the crank assemblies are driven so as to allow for the spaces between successive blanks. As the strip emerges from the work station 72 it is in the form of a tube having a hooked and bumped side seam. The tube is then directed from the end of the conveyor to a mechanism, not shown, which separates successive can body sections from the tube. Preferably in this embodiment a roller 724 having a worm slot therein substantially identical to the roller 120a is driven by and extends forwardly from the gear box 642a to the work station 52a so that positive control of the conveyor chain and thus the successive blank sections of the strip are maintained substantially throughout the apparatus. This additional worm roller may also advantageously be added to the embodiment of this invention described above.

While the preferred embodiment of the present invention have been shown and described herein, it is obvious that many structural details may be changed without departing from the spirit and scope of the appended claims. The terms "blank," "blanks," "successive blanks" and the like used in the claims are intended to cover blanks either in separated form or as integrally joined sections of a continuous strip except in claims in which the blanks are specifically defined as being separate or in strip form.

The invention is claimed as follows:

1. An apparatus for forming can bodies comprising means for continuously successively conveying a plurality of blanks along a predetermined path of travel, means disposed adjacent said path of travel and continuously moveable in timed relationship with said conveying means along an endless path of travel a portion of which extends along said first mentioned path of travel for slitting and notching marginal side seam portions of successive blanks continuously moving along said first mentioned path of travel, means disposed along said first mentioned path of travel and continuously movable in timed relationship with said conveying means along an endless path of travel a portion of which extends along said first mentioned path of travel for folding opposite slit and notched marginal side seam portions of successive continuously moving blanks in opposite directions, horn means expandable and reciprocably moveable in timed relationship with said conveying means adjacent said first mentioned path of travel, means disposed adjacent said horn means for hooking side seam portions of successive continuously moving blanks around said horn means, and means moveable in timed relationship with said horn means and said conveying means around an endless path of travel a portion of which is adjacent said horn means and extends in the direction of said first mentioned path of travel for bumping hooked side seam portions of successive continuously moving blanks when the blanks are on the horn means in expanded condition and the horn means is moving in the direction of said first mentioned path of travel.

2. An apparatus, as defined in claim 1, which includes means for feeding successive blanks to said conveying means and for arcuately bending successive blanks beyond the elastic limit of the blank material sufficiently to enable the blanks to be subsequently curled around said horn means substantially without further cold working of the blank material beyond its elastic limit.

3. An apparatus, as defined in claim 1, which includes means for positively locating a portion of the conveying means adjacent one of said means operable on the blank marginal side seam portions for promoting accurate formation of said marginal side seam portions.

4. An apparatus, as defined in claim 3, wherein said conveying means includes an endless chain of links connected by transverse pins, and wherein said locating means comprises a first member carried by said slitting and notching means for embracing and locating predetermined conveying means pins, and cooperable pin means and bushing means mounted on said conveying means and said slitting and notching means for accurately locating the conveying means with respect to said slitting and notching means.

5. An apparatus, as defined in claim 3, wherein said conveying means includes an endless chain having spaced members secured thereon and carrying blank engaging and retaining means, and wherein said locating means includes a driven roller disposed longitudinally of said chain and having helical groove means thereon, and elements mounted on said spaced members and disposed for entering said groove means to be positively located with respect to each other by said groove means, said roller also serving to drive said conveyor chain.

6. An apparatus, as defined in claim 1, which includes means moveable in timed relationship with said horn means and said bumping means around an endless path of travel a portion of which is adjacent said horn means and extends in the direction of said first mentioned path of travel for supporting said horn means oppositely from said bumping means during a bumping operation.

7. An apparatus, as defined in claim 1, wherein said means for folding opposite marginal side seam portions of successive blanks includes cooperable die means moveable with said slitting and notching means for folding slit and notched side seam portions substantially 90°, and roller means disposed at opposite sides of said conveying means respectively for further folding opposite marginal side seam portions of successive blanks substantially diagonally inwardly.

8. An apparatus, as defined in claim 1, wherein said conveying means comprises an endless chain mounted on a pair of spaced sprocket means, a plurality of spaced members mounted on longitudinally spaced portions of said chain so that adjacent pairs of said members relatively spread apart as their associated portion of the chain passes around one of said sprocket means and to an upper run of the chain and then move relatively together, and oppositely disposed jaw elements carried by and yieldably biased toward each of said cooperable pairs of members for resiliently gripping and retaining can body blanks.

9. An apparatus for forming can bodies comprising an endless continuously moveable conveyor extending around a pair of spaced rotatable wheel means, pairs of spaced gripping means on said conveyor for receiving and retaining successive can body blanks, means adjacent a conveyor loading station for arcuately bending successive blanks beyond the elastic limit of the blank material sufficiently to enable the blanks to be subsequently formed into cylindrical bodies without further working of the material beyond its elastic limit and for feeding the blanks to successive pairs of blank gripping and retaining means on the conveyor, a pair of dynamically balanced crank assemblies mounted above and below and driven in timed relationship with the upper run of said conveyor, each of said assemblies including tool means continuously moveable along generally elliptical paths of travel and cooperable for working marginal side seam portions of successive continuously moving blanks on said conveyor, means disposed adjacent said conveyor for folding previously worked marginal side seam portions of successive blanks, reciprocable carriage means mounted above said upper run of the conveyor, an expandable horn connected to and extending forwardly of said carriage means, means disposed adjacent said conveyor for flexing successive blanks having folded marginal side seam portions around said horn and for hooking marginal side seam portions of successive blanks, a second dynamically balanced crank assembly connected with said carriage means and said horn for reciprocating the carriage means and horn and for expanding the horn in timed relationship with said conveyor, a bumping tool carried by said second crank assembly and moveable around a generally elliptical path of travel for bumping hooked side seams of can body blanks on said horn when the horn is expanded, and additional dynamically balanced crank assembly means driven in timed relationship with said second crank assembly and carrying means continuously moveable about a generally elliptical path of travel for supporting said horn beneath the bumping tool during a bumping operation.

10. An apparatus for forming can bodies comprising means for continuously conveying a plurality of blanks successively along a predetermined path of travel, cooperable tool means continuously driven along generally elliptical paths of travel adjacent to and having portions extending along said first mentioned path of travel for working marginal side seam portions of succesive blanks, horn means reciprocably mounted adjacent said path of travel for lineal movement with and parallel to said conveying means during a side seam bumping operation, means disposed adjacent said first mentioned path of travel for folding previously worked marginal side seam portions of the blanks, means for hooking folded side seam portions of successive body blanks around said horn means, bumping means moveable about a generally elliptical path of travel for bumping hooked side seam portions of can body blanks around said horn means when the horn means is moving in the direction of said first mentioned path of travel, and means for driving said conveying means, said cooperable tool means, said horn means and said bumping means in timed relationship.

11. An apparatus for forming can bodies comprising means for continuously conveying successive sections of sheet material along a predetermined path of travel, tool means mounted for movement in timed relationship with said conveying means along an elongated endless path of travel a portion of which is adjacent and extends in the direction of said first mentioned path of travel for working marginal side seam portions of successive continuously moving sections of the sheet material, and means disposed along said first mentioned path of travel for subsequently joining side seam portions of successive sheet material sections, said tool means including cooperable tool members disposed in opposing relationship above and below said path of travel, and said means supporting said tool members including upper and lower crank assemblies having head members moveable around generally elliptical paths of travel portions of which extend along said first mentioned path of travel, said tool members respectively being mounted on said upper and lower crank assembly head members.

12. An apparatus, as defined in claim 11, wherein said conveying means comprises an endless chain of links connected by a cross pin means, said apparatus including a member carried by said lower crank assembly for embracing predetermined successive pairs of said pin means for approximately locating successive portions of said chain with respect to said tool members, and cooperable generally vertical pin and bushing means carried by said chain and one of said crank assemblies for positively accurately locating portions of said chain with respect to said tool members.

13. An apparatus for forming can bodies comprising means for continuously successively conveying sections of can body sheet material along a predetermined path of travel, means adjacent said path of travel for folding opposite marginal side seam portions of successive sections of the sheet material, reciprocable and expandable horn means disposed adjacent and longitudinally of said path of travel, means disposed for hooking side seam portions of successive sections of the sheet material around said horn means, bumping means mounted for movement around an elongated endless path of travel a portion of which extends along said horn means for bumping hooked side seam portions of continuously moving sections of the sheet material surrounding said horn means, and means for actuating said conveying means, said horn means and said bumping means in timed relationship so that side seam portions of successive sections of the sheet material are bumped when the horn means is expanded and the horn means and bumping means are moving in the same direction as and at substantially the same lineal speed as the sheet material.

14. An apparatus, as defined in claim 13, wherein said successive sections of the sheet material are separate blanks, and said conveying means includes means for receiving and retaining separate successive blanks in predetermined spaced relationship.

15. An apparatus, as defined in claim 13, wherein said sheet material is in the form of a continuous strip, and said conveying means includes a series of spaced means for engaging and locating the successive sections of the strip.

16. An apparatus, as defined in claim 13, which includes a crank assembly carrying said bumping means and moving said bumping means around a generally elliptical path of travel, a reciprocable slide, means secured to said slide and supporting said horn means, said horn means including an actuating rod for accomplishing expanding thereof, and lever means shiftably mounted on said slide means and connected with said crank means and said actuating rod so that said crank means serves to reciprocate said slide means and said horn means and also to control expansion and contraction of said horn means.

17. An apparatus, as defined in claim 13, which includes means mounted for movement around an elongated endless path of travel in timed relationship with said horn means and said bumping means for supporting said horn means generally oppositely from said bumping means during a bumping operation.

18. An apparatus, as defined in claim 16, which includes a pair of crank assemblies disposed at opposite sides of and below said horn means and driven in timed relationship with respect to said first mentioned crank assembly, and support elements respectively carried by said last mentioned crank assemblies for movement about generally elliptical paths of travel for supporting said horn means generally oppositely from said bumping means during a bumping operation.

19. An apparatus, as defined in claim 13, wherein the means for hooking side seam portions around said horn means comprises a pair of cooperable rollers disposed at opposite sides of said horn means and adapted to form successive sections of the sheet material so that their side seam portions are disposed in overlapping relationship.

20. An apparatus, as defined in claim 19, which includes a pair of converging plow means disposed at opposite sides of said first mentioned path of travel in advance of said rollers for flexing successive sections of the sheet material sufficiently to enter between said rollers.

21. A method of forming can bodies comprising successively arcuately bending substantially flat can body blanks beyond the elastic limit of the blank material sufficiently to enable the blanks to be both substantially flattened and also formed into substantially cylindrical bodies without further substantial working of the material beyond its elastic limit, then substantially flattening successive blanks and processing marginal side seam portions thereof, and subsequently shaping successive blanks into substantially cylindrical bodies and joining the side seam portions thereof.

22. A method of producing can bodies, as defined in claim 21, wherein the successive blanks are continuously advanced along a predetermined path of travel during the processing of their marginal side seam portions and during the formation of the blanks into cylindrical bodies and the joining of the side seam portions of the blanks.

23. A method of producing can bodies comprising successively arcuately bending substantially flat can body blanks beyond the elastic limit of the blank material sufficiently to enable the blanks to be both substantially flattened and also shaped into substantially cylindrical bodies without further substantial working of the material beyond its elastic limit, then substantially successively flattening the can body blanks and continuously advancing said blanks along a predetermined path of travel, then notching, slitting and folding marginal side seam portions of the substantially flattened continuously advancing blanks, then returning the blanks to their bent condition, and subsequently shaping successive blanks into substantially cylindrical bodies and hooking and bumping the side seam portions of successive blanks while the blanks are continuously moving along said predetermined path of travel.

24. An apparatus for forming can bodies from a continuous strip of sheet material comprising means for continuously conveying successive sections of said strip along a predetermined path of travel, tool means disposed in advance of said conveying means and mounted for movement in timed relationship with said conveying means along an endless path of travel a portion of which is adjacent and extends in the direction of said first mentioned path of travel for forming apertures in said strip respectively bisected by imaginary lines separating successive can body sections of the strip, said conveying means including an endless series of projections adapted to extend into said apertures for engaging and positively feeding and locating successive sections of said strip, and means disposed along said first mentioned path of travel for subsequently forming said strip into a tube and for joining side seam portions of successive sections of said strip, said means for forming said strip into a tube and joining side seam portions thereof including means for folding opposite marginal side seam portions of successive sections of the strip, reciprocable and expandable horn means disposed adjacent and longitudinally of said first mentioned path of travel, means disposed for hooking the folded side seam portions of successive strip sections, bumping means mounted for movement around an elongated endless path of travel a portion of which extends along said horn means for bumping hooked side seam portions of continuously moving sections of the strip surrounding said horn means, and means for actuating the conveying means, said horn means and said bumping means in timed relationship.

25. An apparatus, as defined in claim 14, which includes means on said horn means for engaging leading and trailing edges of a blank surrounding the horn means for squaring opposite ends of said blank prior to the bumping of said side seam portions.

26. In a method of forming can bodies, the combination of steps comprising continuously advancing a continuous strip of sheet material along a predetermined path of travel, successively transversely arcuately bending successive can body blank sections of said strip beyond the elastic limit of the sheet material sufficiently to enable the blank sections to be both substantially flattened and also formed into substantially cylindrical bodies without further substantial working of the material beyond its elastic limit, forming a longitudinally extending series of spaced apertures in the continuously advancing strip with said apertures respectively located on imaginary lines separating successive can body blank sections of the strip, then positively engaging and locating margins of the strip defining said apertures through can body blank sections moving along a portion of said path of travel and thereby positively locating each of said last mentioned can body blank sections, substantially flattening successive blank sections and then processing marginal side seam portions of blank sections moving along said path of travel portion, and subsequently shaping successive blank sections into substantially cylindrical shapes and joining side seam marginal portions thereof while the blank sections are moving along said path of travel portion.

References Cited in the file of this patent

UNITED STATES PATENTS

| | | |
|---|---|---|
| Re. 11,533 | Hume | Apr. 21, 1896 |
| 549,725 | Johnson | Nov. 12, 1895 |
| 2,142,235 | Burns | Jan. 3, 1939 |
| 2,187,740 | Hothersall | Jan. 23, 1940 |
| 2,319,280 | Widell | May 18, 1943 |
| 2,444,463 | Nordquist | July 6, 1948 |
| 2,444,465 | Peter | July 6, 1948 |
| 2,551,616 | Maher | May 8, 1951 |
| 2,597,893 | Nordquist | May 27, 1952 |
| 2,682,850 | Close | July 6, 1954 |
| 2,741,204 | Winters | Apr. 10, 1956 |
| 2,773,465 | Gedde | Dec. 11, 1956 |
| 2,786,432 | Shaw | Mar. 26, 1957 |